Jan. 11, 1955  C. W. KLOSTERMANN  2,699,534
TWO-PIECE SEPARABLE ELECTRICAL CONNECTOR
Filed June 8, 1951
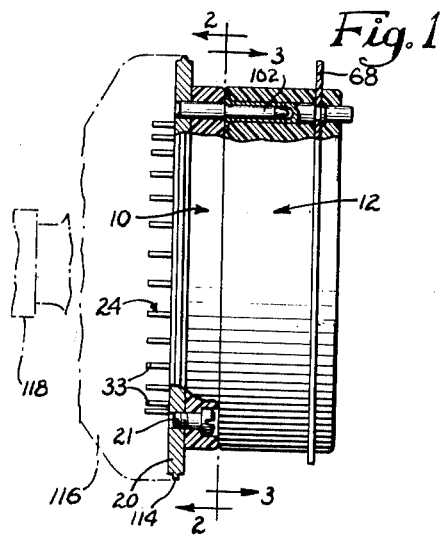
*Fig. 1*
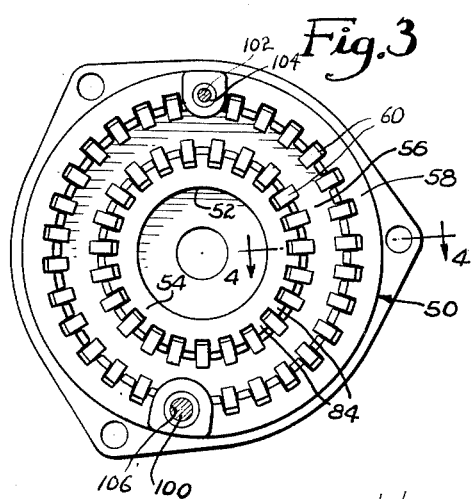
*Fig. 3*
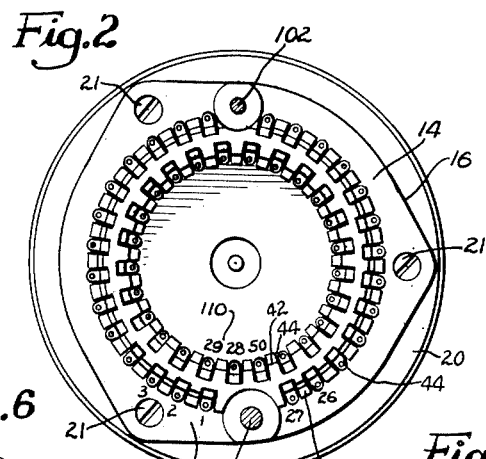
*Fig. 2*
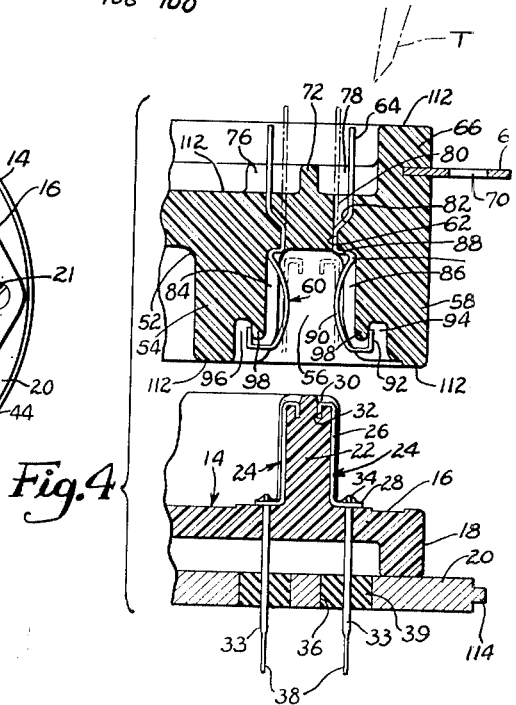
*Fig. 4*
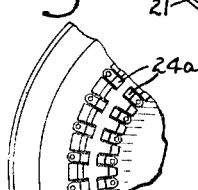
*Fig. 6*
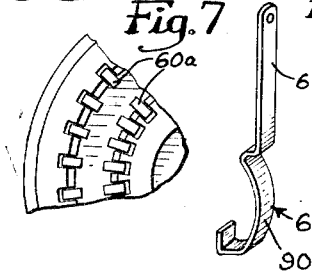
*Fig. 7*  *Fig. 5*
Inventor
Curt W. Klostermann
by: Carlson, Pitzner, Hubbard & Wolfe
Attys.

United States Patent Office 2,699,534
Patented Jan. 11, 1955

2,699,534

TWO-PIECE SEPARABLE ELECTRICAL CONNECTOR

Curt W. Klostermann, Chicago, Ill., assignor to Donald B. Alexander, Edgar R. Bourke, Henry T. Chamberlain, John F. Mannion, Ernest W. Schneider, Walter A. Wade, and Charles S. Vrtis, not individually but as trustees of The Arthur J. Schmitt Foundation, a charitable trust Application June 8, 1951, Serial No. 230,468

7 Claims. (Cl. 339—193)

The present invention relates to separable electrical connectors and more particularly to a two-piece connector of the friction fit type having a plurality of electrically independent contact elements associated with each piece and in which each contact element of one piece will become electrically connected to a corresponding contact element of the other piece when the two pieces are assembled upon each other.

Electrical connectors constructed in accordance with the principles of the present invention are possessed of a wide variety of uses, too numerous to mention. A few of the more important uses to which the connector may be put are in the establishment of auxiliary testing circuits for the indirect testing of electrical equipment having multi-strand cables leading to or forming a part of the several electrical circuits such as are present in telephonic or telegraphic equipment, accounting machinery such as tabulators, electronic calculators, railway signaling devices, illuminated signboards, relay operated amusement devices, telemetric meter reading devices, impulse emitters, and other similar equipment. The present connector may also be found useful in connection with such devices for direct testing thereof by the establishment of protective circuits for the several circuits which may be out of commission during the direct testing thereof by resistance or other testing methods.

Apart from the testing of such electrical equipment, the invention has a multitude of other uses wherein the connector may be put to a more permanent use in the simultaneous making and breaking of electrical circuits at will. Broadly, the present separable connector unit will be found useful wherever circuit connections can be made by the attachment of the two separable units of the connector, and conversely, wherever such connections can be broken by detachment of the separable units thereof. Irrespective, however, of the particular use to which the present connector may be put, the essential features of the invention are at all times preserved.

The objects of the invention are diversified and among the principal objects is the provision of an improved circuit connector wherein a connector of limited area can provide for a larger number of circuit connections than has heretofore been made possible. A similar and related object is to provide a connector in which the grouping and spacing of the contact elements of each half of the two-piece separable connector is such as to accommodate a maximum number of electrical connections. As regards the positioning of the contact elements, another more specific and related object is the provision of an electrical connector of the type which is sometimes referred to by those skilled in the art as the "two-in-line" type wherein two rows of identical male or female contact elements are provided on either or both counterparts of the connector, and in which, according to the present invention, the multiplicity of the electrical connections is enhanced by the circular grouping of the various contact elements about a central axis.

Still considering the grouping of the various contact elements on their respective connector parts, the invention, in one form thereof, contemplates the provision of a connector part involving circularly arranged rows of contact elements in which, for a given number of contact elements, a larger number of elements are situated in the outer ring or row and a lesser number are situated in the inner row, thereby permitting equal spacing between adjacent contact elements of the same row. In an alternate form of the invention involving circularly arranged rows of contact elements, the invention contemplates the positioning of one-half of the total number of contact elements in the outer circular row and the positioning of the other half in the inner circular row, together with a staggering of the thus positioned contact elements so that equal spacing of the contact elements of one row from the contact elements of the other row may be attained. Since, according to the invention, the various contact elements are mounted in and supported by an insulating medium having high dielectric value, the provision of a connector part having concentric circular rows of contact elements grouped as above outlined fulfills another object of the invention wherein a high dielectric factor may be maintained between the various contact elements utilizing a relatively thin insulating wall structure between the two rows of contact elements thereby permitting a reduction in the overall dimensions of the assembled two-piece connector.

Another object of the invention is to provide an electrical connector of the character briefly outlined above consisting of separable connector parts or sections in which each contact element is disposed within an individual recess or "pocket" of the dielectric material constituting the section casing, and in which the walls between adjacent pockets on the mating sections move into alinement and substantial contiguity or contact, one with another, when the mating sections are brought together in connected relationship, thus enclosing each pair of mating and electrically connected contact elements within a separate and individual "cell" or compartment. By such an arrangement intershorting of nonmating contacts due to the building up of foreign conducting particles or moisture within the section casing is effectively prevented. Furthermore, by this arrangement, rupture of the metal of one pair of mating contacts due to the possible application of an overload voltage thereto will be confined to the enclosing compartment and molten material or the products of fusion will not come in contact with or adhere to adjacent contact elements.

A still further object of the invention is to provide a two-piece separable electrical connector in which the cooperating contact elements of each pair thereof are designed for frictional, and consequently electrical, contact with each other and in which the frictional engagement between the various contact elements is the sole coupling means for maintaining the two sections of the connector together when assembled, thus obviating the necessity of employing extraneous fastening devices for holding the sections coupled. A related object is to provide such a connector wherein a relatively low manual pressure is required to effect coupling of the two sections together and in which a relatively slight amount of manual force is required to separate the coupled sections. Yet another related object of this nature is to provide a two-piece connector having cooperating mating spring contact elements so designed and arranged in their respective connector sections that, after initial orientation and contact between the mating metallic contact elements of the two sections, an increasing degree of force, albeit of low proportions, is required to move the two sections relative to each other toward their final positions, and in which, after partial coupling has been attained, the required degree of force abruptly drops off so that the final degree of force required to complete the coupling operation is of a lesser value and moreover is constant in its application until the final or "home" position of the two sections has been attained. In carrying out this last mentioned object of the invention, a two-piece separable coupling has resulted in which initial incomplete coupling of the two connector sections cannot be sustained upon manual release of the couplings. Conversely, incomplete or partial uncoupling of the two sections cannot be sustained since the mating contact elements of the opposed sections will remain in full and adequate frictional and electrical contact with each other until such time as the two sections become separated to the point where the mating pairs of contacts will frictionally repel each other, so to speak, and relieve the operator of the responsibility of manually effecting the final separation of the two sections. Furthermore, with an arrangement of this character during coupling of the two parts, although a substantially constant degree of force is required to bring the two sections to their final home position, the mounting degree of force necessary to initially bring the two sections into full electrical coupling relationship is sufficiently great that the normal tendency is to drive the two sections to their fully coupled home position. Stated in other words, any coupling of the two sections to a degree less than the fully coupled position would require something more than ordinary control of the reflex muscles of the fingers.

The phenomena described above in connection with the coupling of the two connector sections give to the sense of touch a snap action in the coupling thereof where actually no snap action tending to positively draw the two sections together is present. While a true snap action in the coupling of two connector sections together may have certain advantages for specific installations, as for example where vacuum tubes are employed in upside down positions, it also has decided disadvantages in that in the uncoupling of the two sections it is difficult if not impossible to control the reflex muscles and the degree of force necessary to overcome the snap action sometimes results in uncontrolled impact with adjacent delicate electrical instrumentalities and consequent damage thereto or electrical shock. The present invention is designed to overcome the above noted limitations that are attendant upon the use of separable connectors which permit of snap action in the assembly and disassembly of the parts while at the same time preserving many of the benefits thereof.

Yet another object of the invention is to provide a two-piece electrical connector which, as outlined above, is possessed of mating contact elements which frictionally engage and slide upon each other during the coupling and uncoupling operation and which, by so doing, contribute toward a self-cleaning of the contact elements in areas thereof which come into mutual engagement over a relatively wide region of coextensive electrical contact. This feature, coupled with the fact that the individual mating pairs of contact elements are substantially completely enclosed by internal wall surfaces of the dielectric material as previously described, further contributes toward cleanliness of the individual contact elements in that the excrescent material in and about one pair of contacts is unlikely to find its way within the enclosed casing sections so as to cause fouling of other contact elements.

A further object of the invention is to provide an electrical connector of this character which, despite space limitations for a given number of pairs of contact elements, may employ individual pairs of contact elements presenting to each other broad areas of both frictional and electrical contact, thus materially raising the voltage characteristics of the contact elements, the current transfer ability thereof, and minimizing arcing at the contact areas.

Another object of the invention is to provide a multiple contact two-piece separable connector of the character set forth above in which each part thereof is in the form of a molded dielectric casing and in which the various contact elements associated therewith may readily be assembled thereon by a relatively simple operation involving the use of a special flanging tool and in which they may be readily removed therefrom for purposes of replacement when desired.

Another object of the invention is to provide a two-piece separable connector having a large number of mating pairs of contact elements and in which, when the connector sections are coupled, the contact elements of each pair are in frictional and electrical contact by a so-called "floating connection" wherein neither contact element is constrained to bind against an adjacent portion of the dielectric supporting casing or section and in which freedom of movement due to any thermostatic action that may take place within the metallic structure of the contact elements is accommodated. Stated in other words, it is an object of the invention to provide a connector of this character in which the pressure of the various contact elements on one another is self-equalizing.

The self-equalizing action of the various contact elements outlined above, in addition to preventing binding of the individual mating contact pairs, also assist in facilitating uncoupling of the two sections of the connector by a so-called manual "rocking" action between the two parts. Since the advent of two-piece separable connectors, of which the well-known "Jones plug" is exemplary, technicians have been in the habit of effecting separation or uncoupling of the two parts by means of a rocking action wherein the sections are axially misalined, first in one direction and then in the opposite direction while at the same time exerting a moderate pull on the two sections tending to separate them. The net result of this is to gradually work the two sections away from each other so that the final uncontrolled "pull away" force that exists when ultimate complete separation of the sections takes place is minimized. The present construction lends itself admirably to such rocking action in that the self-equalizing action above noted will permit a wider degree of axial misalinement between the sections during the rocking thereof than has heretofore been possible and a consequent reduction in the number of rocking steps required to bring the two sections to the point of complete separation.

It is additionally an object of the invention to provide a two-piece separable connector involving the use of a large number of closely spaced but electrically separated contact pairs and in which effective cooperating locating means are provided on the connector sections to insure proper mating of the contact elements of each pair thereof each time the sections are coupled. A somewhat related object is to provide a connector of this sort having locating means on the two connector sections, which locating means in addition to serving its locating function, also serves to provide a reaction point or points from which relative movements between each pair of contact elements may take place so that any misalinement or resultant undue pressure differential between the contact elements of one pair will not be reflected through the casing sections and affect the pressure differential of other pairs of contact elements.

Still another object of the invention is to provide a connector of the two-piece separable type in which the mountings for the individual contact elements of at least one of the sections are allowed freedom of movement within limits to permit proper frictional mating of the contact elements of each pair thereof, while at the same time each contact element is confined within relatively narrow limits of motion so that, whether the sections are in coupled or uncoupled condition, none of the contact elements can be moved to a position wherein the elastic limit of the metal thereof is exceeded. By such an arrangement there is no danger of any of the contact elements becoming bent out of line with a consequent impairment of its efficiency as a receiver and conductor of electrical current.

Another object of the invention is to provide a two-piece separable connector in which the two sections thereof present, each to the other, smooth camming surfaces both as regards the presentation of the mating electrical contact elements to each other, as well as the presentation of the opposed mating portions of the dielectric casings or sections of the connector. An ancillary object is to provide such a connector in which no obstructing parts exist on one casing which might interfere with a similarly obstructing part on the other casing when the two casings are brought together with a reasonably close degree of alinement preparatory to the coupling thereof.

Another object of the invention is to provide a separable two-piece connector capable of accommodating a large number of pairs of mating contact elements in which each section is provided with inner and outer, circularly arranged rows of contact elements, as previously described, together with locating means, likewise as previously described, and in which a more equitable distribution of the contact elements in the two rows is effected by positioning the locating means substantially within the confines of the outer row of contact elements while interrupting the sequential placement of contact elements to accommodate the locating means, thereby not only effecting a more equal distribution of the contact elements in the two rows while maintaining equal spacing thereof, but also reducing the overall diameter of the assembled or coupled connector.

The provision of a two-piece separable connector of the character outlined above which is rugged and durable and which consequently is possessed of a relatively long life; one which is possessed of no relatively moving parts other than the contact elements themselves which are capable of but limited freedom of movement, and which consequently is unlikely to get out of order; one which may be manufactured at a relatively low cost; one which is attractive in its appearance and design; and one which otherwise is well adapted to perform the services required of it, are further desiderata which have been borne in mind in the production and development of the present invention.

In the accompanying single sheet of drawings forming a part of this specification, two embodiments of the invention have been shown.

In these drawings:

Figure 1 is a side elevational view, partly in section, of an electrical connector constructed in accordance with the principles of the present invention. In this view, the parts of the connector are shown in coupled relationship.

Fig. 2 is a sectional view taken substantially along the line 2—2 of Fig. 1.

Fig. 3 is a sectional view taken substantially along the line 3—3 of Fig. 1.

Fig. 4 is a sectional view taken substantially along the line 4—4 of Fig. 3.

Fig. 5 is an enlarged perspective view of a contact element employed in connection with the invention, and Figs. 6 and 7 are fragmentary inside end elevational views showing a modified or alternative arrangement of contact element groups which may be employed in connection with the invention.

While the invention is susceptible of various modifications and alternative constructions, there is shown in the drawings and will herein be described in detail the preferred embodiment, but it is to be understood that it is not thereby intended to limit the invention to the form disclosed, but it is intended to cover all modifications and alternative constructions falling within the spirit and scope of the invention as expressed in the appended claims.

Referring now to the drawings in detail, the improved electrical connector comprising the present invention involves in its general organization two connector parts or sections 10 and 12, each section being generally of cylindrical configuration and including a casing formed of a high dielectric material, and a plurality of contact elements, together with cooperating locating means of the two sections.

The casing 14 of the section 10 is of one-piece molded construction and includes a substantially flat base portion 16 of three-lobed design and having a laterally turned rim 18 which seats against one face of a circular disklike backing plate 20 and to which it is attached by means of screws 21, one screw being situated adjacent each apex of the three-lobed base portion 16. The casing 14 is formed with an annular wall 22 in the medial regions thereof and which surrounds and is concentric with the longitudinal axis of the casing. The wall 22 serves as an intervening wall between two circularly arranged groups of contact elements 24 as well as serving as a centering protuberance which is designed for registry and cooperation with an annular groove or recess provided in the casing of the section 12, all in a manner and for a purpose that will be made clear presently.

Each of the contact elemnets 24 is in the form of a strip of ribbonlike material of a conducting nature having a medial body portion 26 which may, if desired, be arcuate in cross section, a terminal foot portion 28 and a reversely turned end or hook portion 30, the extreme end of which extends into a recess 32 formed in the end of the wall 22 as shown in Fig. 4. The body portion 26 of the contact element is positioned in coextensive contact with the side of the wall 22 and the foot portion 28 seats upon the upper surface of the flat base 16. A terminal rod 33 has its upper end spot welded or otherwise secured as at 34 to each foot portion 28 and extends downwardly through the base portion 16 and projects completely through a relatively large circular opening 36 formed in the backing plate 20 and the extreme end thereof is flattened as at 38 to provide a terminal for electrical connection thereto of a suitable lead-in wire (not shown). A suitable sealing compound 39 of insulating material, which may be a glass seal, is disposed in each opening 36 and serves to reinforce and center the terminal rod 33 in the opening.

The wall 22 is provided with a plurality of outwardly and radially extending vertical ribs 40 which are arranged in spaced relationship around the outer periphery of the wall 22. The wall is also provided with a similar series of radially and inwardly extending vertical ribs 42, likewise spaced apart. Each adjacent pair of ribs 40 or 42, as the case may be, in combination with the intervening surface of the wall 22 provides an open-sided pocket or recess 44 in which the body portion 26 of one of the contact elements 24 is adapted to be situated so as to lie entirely within the confines of the pocket or recess 44. The height of the wall 22 and also of the various ribs 40 and 42 is slightly in excess of the length of the contact elements 24 and thus each element is nested within a respective pocket or recess 44 for a purpose which will become clear presently.

The casing 50 of the section 12 is of one-piece molded construction and is of generally cylindrical configuration. The inner side of the casing 50, i. e. the side which opposes the mating face or side of the casing 14 of the section 10, is provided with a centrally disposed well 52 bounded by a circular wall portion 54 which is spaced inwardly from the periphery of the casing 50 so as to define a circular trough 56 bounded on its outer side by a rim portion 58.

The circular trough 56 serves to accommodate two circular rows of contact elements 60, each element being designed for frictional engagement and consequent electrical contact with one of the contact elements 24 in the two circular rows of contact elements provided on the casing 14 of the section 10. Each contact element 60 projects completely through an opening 62 provided in the casing 50 at the bottom of the trough 56 and the outer end of the contact element extends generally in an axial direction and provides a terminal strip 64 for attachment thereto of a lead-in wire (not shown). The outer face of the casing 50 is formed with an annular rim 66 in which there is molded a laterally extending panel attachment ring 68 which may be formed of metal and which is preferably of three-lobed design as shown and has attachment holes 70 provided in the apices thereof. A circular rib 72 projects outwardly from the outer face of the casing 50 and separates the inner row of contact elements from the outer row thereof. A series of laterally extending partitioning or dividing ears 76 and webs 78 respectively formed on the rib 72 serve to separate the adjacent terminal strips 64 from each other.

The contact elements 60 in the two circular rows thereof are substantially identical in form and the medial region of each element is firmly secured within the molded casing 50 where it passes through the opening 62. Each contact element 60 may be initially constructed in the form shown in dotted lines in Fig. 4 wherein it is provided with a straight shank portion designed for insertion through the opening 62. The opening 62 is formed with an enlarged bore 80 having an inclined shoulder portion 82. When the contact element is first inserted through the opening 62, the terminal portion 64 thereof normally assumes the dotted line position thereof and, in order to anchor the contact element in position, a forming tool such as is shown at T and having a bevelled end, is inserted behind the terminal portion 64 and the latter may, by manipulation of the tool, be deformed into the shape shown in full lines with the terminal portion 64 offset from its initial position and bearing against the shoulder 62.

The outer surface of the circular wall 54 is formed with a series of radially outwardly extending dividing ribs or walls 84, one of which projects between the contact elements of each adjacent pair thereof in the inner row of contact elements. Similarly the inner surface of the wall 54 is provided with a series of radially inwardly extending dividing ribs or walls 86, likewise serving to separate adjacent contact elements in the outer circular row thereof. Each contact element 60 in the outer row projects through its respective opening 62 and is turned laterally as at 88 toward the rim portion 58 from whence it is again turned laterally as at 89 and bowed as at 90 and finally terminates in a reverse bend or hook 92, the end of which extends into a pocket 94 provided in the rim portion 58 at the end thereof. The contacts of the inner row are similarly shaped and the reverse bend or hook 92 thereof has its end projecting into a pocket 96 provided in the end of the circular wall 54.

Reference to Fig. 4 will reveal the fact that each of the recesses 94 and 96 is of considerable width compared to the thickness of the metal of a contact element 60 and the metal of the contact element is of sufficient resiliency that the bowed portion 90 may be spring biased so that the hook portion 92 bears inwardly against a lip 98 which forms one wall of a recess 94 or 96 as the case may be. In the normal position of the contact elements 60, when the two connector sections 10 and 12 are uncoupled, the medial regions of the bowed portions 90 project slightly beyond the confines of the ribs 84 and 86 in order to insure proper electrical contact with the contact elements 24 when the sections 10 and 12 are coupled in the manner subsequently to be described.

In order to insure proper coupling of the two sections 10 and 12 so that the proper counterpart contact elements 24 and 60 will be brought into electrical contact to secure the desired multiple circuit connections, a pair of locating pins 100 and 102 may be provided on the inner face of the casing 14 of the section 10 at positions which are slightly offset from true diametrical opposition. These pins are preferably located in the peripheral regions of the base portion 16 and the pin 100 may be of greater diameter than the diameter of the pin 102. The pins 100 and 102 are designed for register and reception in a pair of sockets or holes 104 and 106, respectively, of appropriate diameter and similarly arranged in slightly offset diametrical relation in the end regions of the rim 58 of the casing 50 of the section 12. The pins 100 and 102 may be tapered as shown and a slight clearance may be afforded between the pins and their respective sockets when the parts are coupled to permit the rocking action previously described when manually uncoupling the two sections.

The action which takes place when coupling and uncoupling the two sections 10 and 12 may best be ascertained by reference to Fig. 4. In coupling the sections, they are brought into approximate axial alinement with the locating pins 100 and 102 in register with the receiving sockets 104 and 106 respectively. The sections are then moved toward each other so that the circular wall 22 having associated therewith the two rows of contact elements 24 enters the circular trough 56 having associated therewith the two rows of contacts 60. As soon as each contact 24 comes into initial frictional contact with its mating contact 60, the bowed portion 90 thereof is caused to recede into the pocket-like recess provided for it by virtue of the radially extending partition walls or ears 84 and 86 and a progressively increasing degree of force is required to move the sections toward each other. This increasing degree of force is not great and as soon as the hooked ends 30 of the contacts 24 move past the center of the bowed portions 90 of the contacts 60, the degree of force necessary to complete the coupling operation drops off sharply and the two parts will rapidly "snap" into fully coupled position with the ends of the circular rim 58 and circular wall 54 abutting against the base 16 of the casing 14.

The circular spacing and disposition of the various mating pairs of contacts 24 and 60 and the arrangement of the radially extending partition walls or ribs 40, 42, 84 and 86 are such that the ribs 40 register with the ribs 86 while the ribs 42 register with the ribs 84 in such a manner as to create a series of individual enclosures or cells for the individual mating pairs of contacts when the two parts are assembled. In this manner each pair of mating contacts is effectively physically and electrically insulated from its adjacent pair of contacts when the parts are coupled.

It is to be noted that when the parts are coupled, the flexing of the various bowed portions 90 of the contacts 60 is such that the hooked end or portion 92 thereof moves into the medial regions of its respective pocket 94 or 96 (Fig. 4) so that limited freedom of movement of the mating contact elements may take place to accommodate slight thermostatic flexing of the metal of the contact elements or to accommodate any rocking movement between the two casings 14 and 50 during the uncoupling operation as previously described.

To facilitate proper connection of the various contact elements 24 and 60 in a desired circuit arrangement, a series of indicia marks 110 may be provided on the inside face of the casing 14 properly identifying the contact elements 24. A similar series of indicia marks 112 may be applied to the inner and outer faces of the casing 50 properly identifying the contact elements 60.

The backing plate 20 may be formed with a peripheral flange 114 to accommodate seating of a suitable cover shown in dotted lines at 116 and having associated therewith a packing gland through which the various lead-in wires leading to the terminal strips 32 of the contact elements 24 may extend.

The invention has been illustrated in Figs. 1 to 3 inclusive as comprising a two-piece separable connector in which each part thereof has associated therewith fifty contact elements arranged in two circular rows. Because of space limitations and because of the obvious fact that the circular line passing through the outer row of contact elements is of greater linear extent than the circular line passing through the inner row of contact elements, a larger number of contact elements has been placed in the outer row than in the inner row. As shown, in both connector sections 10 and 12, the outer rows of contact elements include twenty-seven contact elements while the inner rows include twenty-three contact elements. The discrepancy in number would ordinarily be somewhat greater but for the fact that the locating pins 100, 102 and sockets 104, 106 are positioned to consume the space that would normally be occupied by two contact elements each. By such an arrangement equal spacing between adjacent pairs of contacts in the same row may be maintained.

Since all of the contact elements 24 and 60 are of the single prong variety, and since the mating pairs of contact elements make substantially a single straight line or linear contact, each with its counterpart, neither the contact elements of the connector section 10 nor the contacts of the section 12 can accurately be said to be of the male or of the female variety. However, since the section 10 includes a protuberance in the form of a projecting wall portion 22 which enters a cooperating trough portion 56 associated with the section 12, the former section 10 may, for purposes of claim terminology, herein be referred to as the male connector section and the latter section 12 may be referred to as the female connector section. As a corollary, the contacts 24 may be termed male contacts and the contacts 60 may be termed female contacts.

According to the modified form of connector fragmentarily shown in Figs. 6 and 7, if it is desired to maintain equal spacing between the contact elements of the inner rows and the contact elements of the outer rows, the contact elements 24a may be staggered on opposite sides of the intervening wall 22a of the casing 14a while the contacts 60a on the opposite sides of the trough 56a of the casing 50a may likewise be staggered. In such an instance, the number of contact elements in each row thereof will be maintained equal. By such an arrangement, a relatively thin intervening wall 60a may be provided and a more compact nesting of the various contacts attained.

I claim as my invention:

1. An electrical plug-type connector for connecting together a plurality of electrical terminals, the combination comprising a female housing defining a central trough having a side wall, a plurality of contact elements spaced along said side wall, said contact elements each having a cantilever mounting at one end thereof for springing the elements outwardly away from said side wall, ribs integrally formed on said side walls between said contact elements, said housing being provided with individual pockets registering with the free ends of said contact elements for limiting the outward springing movement thereof, and a mating male member having a ridge of insulating material for insertion in said housing, said ridge having a side wall and having a plurality of contact elements mounted on said side wall for registering with the contact elements in said housing, said male member having ribs integrally formed therein between the contact elements thereon, said latter ribs being dimensioned to lie in face to face relation with the ribs in said housing when the male member is inserted into said housing, thereby to provide individual enclosures for the registering contact members, the pockets in said housing being dimensioned to permit free movement of the ends of the contact elements within the pockets accompanied by cantilever bending of the contact elements in response to the pressure applied by the registering contact elements on the male member when the latter is inserted.

2. An electrical plug-type connector for connecting together a plurality of electrical terminals, the combination comprising a female housing defining a central trough having a side wall, a plurality of leaf spring contact elements spaced side by side along said side wall, ribs integrally formed on said side walls between said contact elements, said contact elements being outwardly bowed for extension beyond said ribs but having means for retaining the ends thereof seated between said ribs, and a mating male member having a ridge of insulating material for insertion in said housing, said ridge having a side wall and having a plurality of contact elements mounted on said side wall for registering with the contact elements on said housing, said male member having ribs integrally formed therein between the contact elements thereon, said latter ribs being dimensioned to lie in face-to-face relation with the ribs in said housing when the male member is inserted into said housing and with the bowed portions of the contact elements in said housing extending between the ribs of the male member.

3. An electrical plug-type connector for connecting together a plurality of electric terminals, the combination comprising a housing defining a trough having opposedly facing side walls, a first set of ribbon-like contact elements spaced along said side walls edgewise with respect to one another, a mating plug having a projecting ridge for insertion in said housing, said ridge having outwardly facing side walls, a second set of ribbon-like contact elements spaced edgewise along such side walls for registering with the contact elements in said housing, said contact elements each having a base portion for anchoring the same relative to its associated wall, the contact elements in at least one of said sets being biased and bowed outwardly for resilient engagement with the registering contact elements and having reversely bent tip portions, and abutment means having a lost motion engagement with said reversely bent tip portions for positioning said tip portions in outwardly sprung alinement while permitting individual retreating movement of the tip portions when the plug is inserted into the housing.

4. An electrical plug-type connector for connecting together a plurality of electric terminals, the combination comprising a housing defining a trough having opposedly facing side walls, a first set of ribbon-like contact elements spaced along said side walls edgewise with respect to one another, a mating plug having a ridge of insulating material for insertion in said housing, said ridge having outwardly facing side walls, a second set of ribbon-like contact elements spaced edgewise along said side walls for registering with the contact elements in said housing, said plug and housing each having ribs integrally formed therein between the individual contact elements, corresponding ribs on such members being dimensioned to lie face to face when the plug is inserted into the housing, said contact elements each having an anchored base portion and each having a hooked tip portion arranged to maintain the elements anchored relative to their respective walls, the contact elements in at least one of said sets being individually sprung and bowed for resilient engagement with the registering contact elements.

5. An electrical plug-type connector for connecting together a plurality of electric terminals, the combination comprising a molded plastic housing defining a trough having opposedly facing side walls, a first set of ribbon-like contact elements spaced along said side walls edgewise with respect to one another, a mating plug of molded plastic having a projecting ridge for insertion in said housing, said ridge having outwardly facing side walls, a second set of ribbon-like contact elements spaced edgewise along said side walls for registering with the contact elements in said housing, said plug and housing each having ribs integrally formed therein between the individual contact elements, corresponding ribs on such members being dimensioned to lie face to face when the plug is inserted into the housing, said contact elements each having an offset base portion and a tip portion, the plug and housing having apertures for receiving the offset base portions for anchoring them firmly relative to the side walls and for bringing out electrical connections, the contact elements in at least one of said sets being sprung and bowed for resilient engagement with the registering contact elements.

6. An electrical plug-type connector for connecting together a plurality of electric terminals, the combination comprising a housing defining a trough having opposedly facing side walls, a first set of ribbon-like contact elements spaced along said side walls edgewise with respect to one another, a mating plug having a ridge of insulating material for insertion in said housing, said ridge having outwardly facing side walls, a second set of ribbon-like contact elements spaced edgewise along said side walls for registering with the contact elements in said housing, said plug and housing each having ribs integrally formed therein between the individual contact elements, corresponding ribs on such members being dimensioned to lie face to face when the plug is inserted into the housing, said contact elements each having a base portion and a tip portion, the plug and housing having apertures for receiving the base portions of the respective contact elements for anchoring the same and for bringing out electrical connections, the contacts in at least one of said sets being sprung and bowed outwardly and having lost motion hook connections at their respective tips for limiting the amount of outward springing.

7. An electrical plug-type connector for connecting together a plurality of electric terminals, the combination comprising a housing defining a trough having opposedly facing side walls, a first set of ribbon-like contact elements spaced along both of said side walls edgewise with respect to one another, a mating plug having a projecting ridge for insertion in said housing, said ridge having outwardly facing side walls, a second set of ribbon-like contact elements spaced edgewise along each of such outwardly facing side walls for registering with the contact elements in said housing, said contact elements each having a base portion for rigidly anchoring the same relative to its associated wall, the contact elements of at least one of said sets having freely movable end portions and being biased and bowed outwardly with respect to its wall, each of such end portions being received in a pocket formed in the adjacent wall, said pockets being dimensioned to limit outward springing of the contact members received therein to an alined position while permitting independent bodily yielding movement of such contact elements in response to the pressure applied by the registering contact elements when the two sets are engaged with one another.

References Cited in the file of this patent

UNITED STATES PATENTS

| Number | Name | Date |
|---|---|---|
| 1,687,074 | Wichert | Oct. 9, 1928 |
| 1,818,177 | Townsend | Aug. 11, 1931 |
| 2,124,182 | Braun | July 19, 1938 |
| 2,195,343 | Sayre | Mar. 26, 1940 |
| 2,220,810 | Bright | Nov. 5, 1940 |
| 2,505,979 | Martin | May 2, 1950 |
| 2,510,944 | Auerbach | June 13, 1950 |
| 2,566,805 | Lavander | Sept. 4, 1951 |

FOREIGN PATENTS

| Number | Country | Date |
|---|---|---|
| 408,748 | Italy | Jan. 9, 1945 |
| 722,858 | Germany | July 24, 1942 |